United States Patent [19]
Sandage

[11] Patent Number: 5,537,597
[45] Date of Patent: Jul. 16, 1996

[54] METHOD AND APPARATUS FOR SUPPORTING REAL MODE CARD SERVICES CLIENTS WITH A PROTECTED MODE CARD SERVICES IMPLEMENTATION

[75] Inventor: David A. Sandage, Forrest Grove, Oreg.

[73] Assignee: Intel Corporation, Santa Clara, Calif.

[21] Appl. No.: 128,462

[22] Filed: Sep. 27, 1993

[51] Int. Cl.$^6$ ........................................................ G06F 9/44
[52] U.S. Cl. .................... 395/700; 364/280; 364/280.2; 364/281.3; 364/DIG. 1
[58] Field of Search ................................ 395/200, 500, 395/650, 700, 800; 364/280, 280.2, 281.3

[56] References Cited

U.S. PATENT DOCUMENTS

| | | | |
|---|---|---|---|
| 4,926,322 | 5/1990 | Stimac et al. | 395/500 |
| 4,928,237 | 5/1990 | Bealkowski et al | 395/500 |
| 5,237,669 | 8/1993 | Spear et al. | 395/400 |
| 5,255,379 | 10/1993 | Melo | 395/400 |
| 5,291,585 | 3/1994 | Sato et al. | 395/500 |

OTHER PUBLICATIONS

Publication of the Personal Computer Memory Card International Association (PCMCIA) entitled: Card Service Specification 2.0; Sunnyvale. California, Nov., 1992.
Publication of the Personal Computer Memory Card International Association (PCMCIA) entitled: Socket Services Specification 2.0; Sunnyvale, California, Nov., 1992.

Primary Examiner—Kevin A. Kriess
Assistant Examiner—Dennis M. Butler
Attorney, Agent, or Firm—Blakely, Sokoloff, Taylor & Zafman

[57] ABSTRACT

PCMCIA defines a standard interface for small portable computer peripherals. Part of the PCMCIA specification defines a Card Services software layer. The current PCMCIA specification defines a Card Services layer that provides Card Services to clients that wish to use PCMCIA cards. A Card Services Compatibility Driver is defined that ensures compatibility with real mode clients. The Card Services Compatibility Driver is a device driver or TSR that loads near the beginning of the computer system boot procedure. The Card Services Compatibility Driver simulates a full implementation of Card Services by supporting only the functions that are legal when no cards are installed in the system even though cards may be installed in the system. Later, a full protected mode implementation of Card Services is loaded into the system. The Card Services Compatibility Driver transfers all the state information it collects during the computer system boot procedure to the full protected mode implementation of Card Services. After receiving this information, the full protected mode implementation of Card Services takes control and services all later Card Services requests. The full protected mode implementation of Card Services also informs the registered Card Services clients of any cards inserted in the system by making card insertion callbacks.

19 Claims, 5 Drawing Sheets

METHOD AND APPARATUS FOR SUPPORTING REAL MODE CARD SERVICES CLIENTS WITH A PROTECTED MODE CARD SERVICES IMPLEMENTATION

FIELD OF THE INVENTION

This invention relates to PCMCIA Card Services implementations. More specifically, the invention relates to a protected mode implementation of PCMCIA Card Services for the Microsoft® Windows™ operating environment that supports real-mode clients of Card Services during the computer system boot procedure.

BACKGROUND OF THE INVENTION

Laptop and notebook sized personal computers have become increasingly popular. One problem with many existing laptop and notebook sized personal computers is that it is difficult to add peripherals to such systems since there are usually no internal expansion slots. Peripherals can be connected to external ports on laptop and notebook sized personal computers; however, the external peripherals hang off the side of the portable computer system thereby making the system no longer portable.

To provide a convenient interface for small peripheral devices, a computer industry consortium drafted a specification defining a standard interface for credit-card sized computer peripherals. The computer industry consortium is known as the Personal Computer Memory Card Industry Association (PCMCIA) and the standard credit-card sized peripherals are known as PCMCIA Cards. The first version of the PCMCIA specification (PCMCIA 1.0) created an interface that could handle memory card expansion as well as some simple peripherals such as card-sized modems. The second version of the PCMCIA specification (PCMCIA 2.0) is a full bus specification capable of handling most common types of computer peripherals, such as hard disk drives and LAN interfaces. (See *PC Card Standard*, Release 2.0, September 1991, Personal Computer Memory Card International Association.)

The PCMCIA standard is defined such that it is possible to plug in and remove cards while the base system is running, without damage to the cards or to the base system. This hot insertion/removal feature is unique to PCMCIA computer hardware. Furthermore, configuration information is kept in memory on a PCMCIA card itself, to allow the system to adapt to the card when it is plugged into a computer system. The PCMCIA standard defines the physical size and shape of PCMCIA cards. The PCMCIA standard also defines power and voltage levels, and connector pinouts. Cards that comply with the PCMCIA standard may be plugged into compatible systems without fear that the connectors won't match or that voltage differences will damage the hardware. The standard also defines the range of configuration information which may be kept on the cards, and indicates how software can read this information.

The PCMCIA hardware includes the socket into which the card is plugged, a connector for conveying power and information between the cards and the computer, and a socket adapter integrated circuit which couples the computer microprocessor to the sockets. The socket adapter contains hardware to generate microprocessor interrupts when a card hardware change event occurs such as a card being inserted or removed, or a card battery running low. Mapping hardware allows the card's memory, I/O, and interrupt to be directed to the proper places within the overall computer system. For example, if a card contains memory, the memory may be mapped such that it appears at any point in the computer's address space below 16 megabytes. Similarly, if a card can generate an interrupt request, the interrupt request can be routed to one of a number of system IRQ lines.

The current PCMCIA standard defines two layers of software that a computer system uses to access and manage PCMCIA cards. The two layers of software are called the Socket Services layer and the Card Services layer. In operation, applications which wish to use PCMCIA cards access the PCMCIA cards by using functions available from the Card Services layer. Applications which use the Card Services functions are known as Card Services "clients". A Card Services client registers with Card Services by calling a Card Services client registration function and providing some client information and the address of a client callback routine. Card Services executes the callback routine when a PCMCIA card related event occurs.

For example, when a hardware event from a PCMCIA card socket occurs, the client's callback routine performs processing associated with the event. Events include hardware events such as card insertion/removal or low battery and software events such as a client requesting exclusive use of a card. Upon card insertion, a registered client might use the callback routine to query the card to determine the card's type. If card was the correct type it would then proceed to configure the card. The card's onboard memory, I/O, and interrupt must be set up to fit the system into which the card has been plugged. Card Services functions enable clients to configure cards by programming the card hardware registers and the PCMCIA adapter.

The Socket Services and Card Services layers are designed such that a single system may have several instances of Socket Services (each instance of Socket Services serving one or more PCMCIA adapters), but only a single instance of Card Services. Clients of the Card Services layer see a number of PCMCIA sockets available but do not see a number of PCMCIA adapters, each of which has one or more sockets. This abstraction, and the configuration management support, are the primary reasons for the Card Services software layer.

In an IBM® compatible personal computer running the real mode DOS environment, the Socket Services software layer of the PCMCIA standard is usually implemented using a ROM, a device driver, or a Terminate and Stay Resident (TSR) program. Most implementations of the Socket Services layer only require about 3K of memory, a relatively small amount of memory.

In a real-mode DOS environment, the Card Services software layer is implemented using a device driver or a TSR program that is loaded after DOS has loaded. Since the Card Services software layer, as defined by the PCMCIA specification, must provide a large number of functions, the Card Services software layer usually requires more than 40K of memory. This relatively large amount of memory used for Card Services can present a problem in memory constrained DOS based computer systems.

The Microsoft® Windows™ operating environment is largely replacing the older DOS only environment in personal computers. The Microsoft® Windows™ environment provides an attractive graphical user interface (GUI) which makes application programs easier to use. The Microsoft® Windows™ operating environment supports DOS applications through the use of DOS virtual machines.

The Microsoft® Windows™ operating environment takes advantage of the extended memory available in computers based on the 386 or later microprocessors. To more efficiently use the computer system memory, protected mode implementations of Card Services that operate in the Windows™ operating environment have been proposed. (See "An Architecture for Implementing PCMCIA Card Services Under the Windows Operating System in Enhanced Mode", Ser. No. 08/041,705, filed Apr. 1, 1993.)

However, a protected mode implementation of Card Services may have compatibility problems with some real mode clients of Card Services. Specifically, some real mode clients of Card Services may require access to Card Services functions during the computer system boot procedure. Since the protected mode implementation of Card Services is not available until after the Microsoft® Windows™ operating environment is loaded, the real mode clients requiring Card Services during the computer system boot will not be able to access the Card Services functions they need.

SUMMARY OF THE INVENTION

It is therefore an object of the present invention to provide a supplement to a protected mode Card Services implementation that provides access to Card Services functions during the computer system boot process.

These and other objectives are accomplished by a Card Services Compatibility Driver. The Card Services Compatibility Driver is a device driver or TSR that loads near the beginning of the computer system boot procedure. The Card Services Compatibility Driver simulates a full implementation of Card Services by supporting only the functions that are legal when no cards are installed in the system even though cards may be installed in the system. Later, a full protected mode implementation of Card Services is loaded into the system. The Card Services Compatibility Driver transfers all the state information it has collected during the computer system boot procedure to the full protected mode implementation of Card Services. After receiving this information, the full protected mode implementation of Card Services takes control and services all future Card Services requests. The full protected mode implementation of Card Services also informs the registered Card Services clients of any cards inserted in the system by making card insertion callbacks.

BRIEF DESCRIPTION OF THE DRAWINGS

The objects, features and advantages of the present invention will be apparent to one skilled in the art, in view of the following detailed description in which.

NOTATION AND NOMENCLATURE

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

Coding Details

No particular programming language has been indicated for carrying out the various procedures described herein. This is due, in part, to the fact that not all languages that might be mentioned are universally available. Each user of a particular computer will be aware of a language which is most suitable for his immediate purposes. In practice, it has proven useful to substantially implement the present invention in C and Intel x86 assembly language, which is then compiled and assembled into machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the present invention.

DETAILED DESCRIPTION

An implementation of PCMCIA Card Services that provides access to Card Services functions during the computer system boot process is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Card Services and Socket Services

Figure 1:
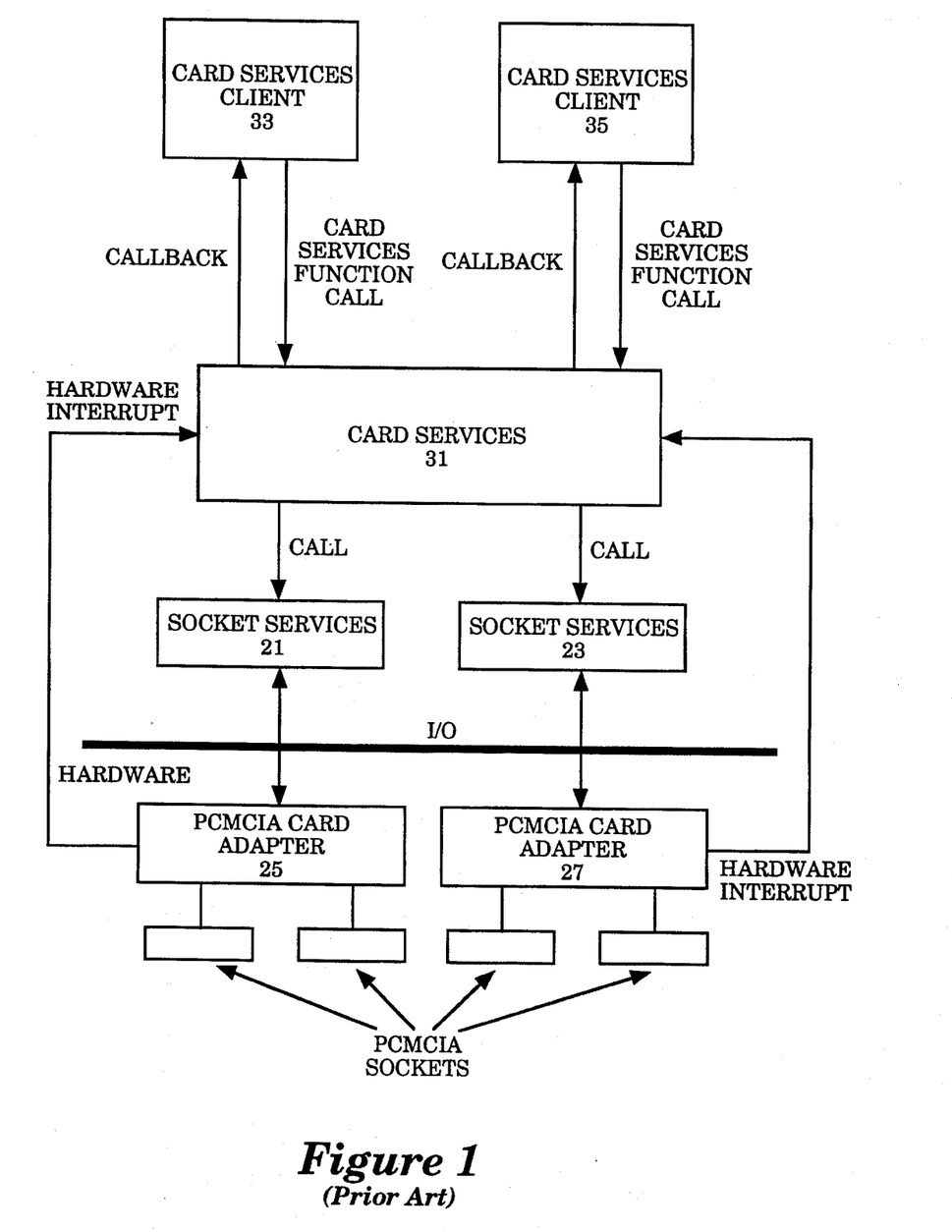
FIG. 1 is a block diagram of the Card Services and Socket Services software layers defined by the PCMCIA specification as used in a computer system.

The current PCMCIA standard defines two layers of software that a computer system uses to access and manage PCMCIA cards: the Socket Services layer and the Card Services layer. FIG. 1 illustrates how the Socket Services and Card Services software layers are related and how the two layers access the PCMCIA cards.

A Socket Services layer is implemented for each particular PCMCIA socket adapter in the system. Each Socket Services implementation provides a set of routines used to configure and control the corresponding PCMCIA socket. Referring to FIG. 1, there is a different implementation of Socket Services (21 and 23) for each particular PCMCIA socket adapter (25 and 27, respectively) in the system. The Socket Services layer is designed such that it can be implemented in ROM and can be part of the system BIOS. The functions in the Socket Services software layer are called by the Card Services layer 31 using a software interrupt mechanism. Specifically, the INT 1A software interrupt is used to access Socket Services functions. The Socket Services layer is independent of the operating system running on the computer system. (See *PCMCIA Socket Services Interface Specification*, Release 2.00, September 1992, Personal Computer Memory Card International Association.)

The Card Services software layer is designed to run on top of one or more instances of Socket Services. The Card Services software layer provides a set of functions that Card Services clients use to access and configure PCMCIA cards. Referring to FIG. 1, the Card Services software layer 31 is located above each implementation of Socket Services and calls the routines from each Socket Services implementation to perform hardware specific functions. The Card Services software layer 31 is operating system dependent and usually is loaded during operating system startup. Real mode Card Services clients call Card Services functions using a software interrupt mechanism. Specifically, the INT 1A software interrupt is used with the AH register set to the hexadecimal value AF to call Card Services. Other types of Card Services clients may access Card Services using other interfaces. The Card Services layer 31 is designed to hide the different PCMCIA socket adapters from Card Services clients (33 and 35), such that the Card Services clients (33 and 35) always have a consistent interface to PCMCIA Cards. (See *PC Card Services Interface Specification*, Release 2.00, September 1992, Personal Computer Memory Card International Association.)

Card Services in Real Mode

Figure 2:
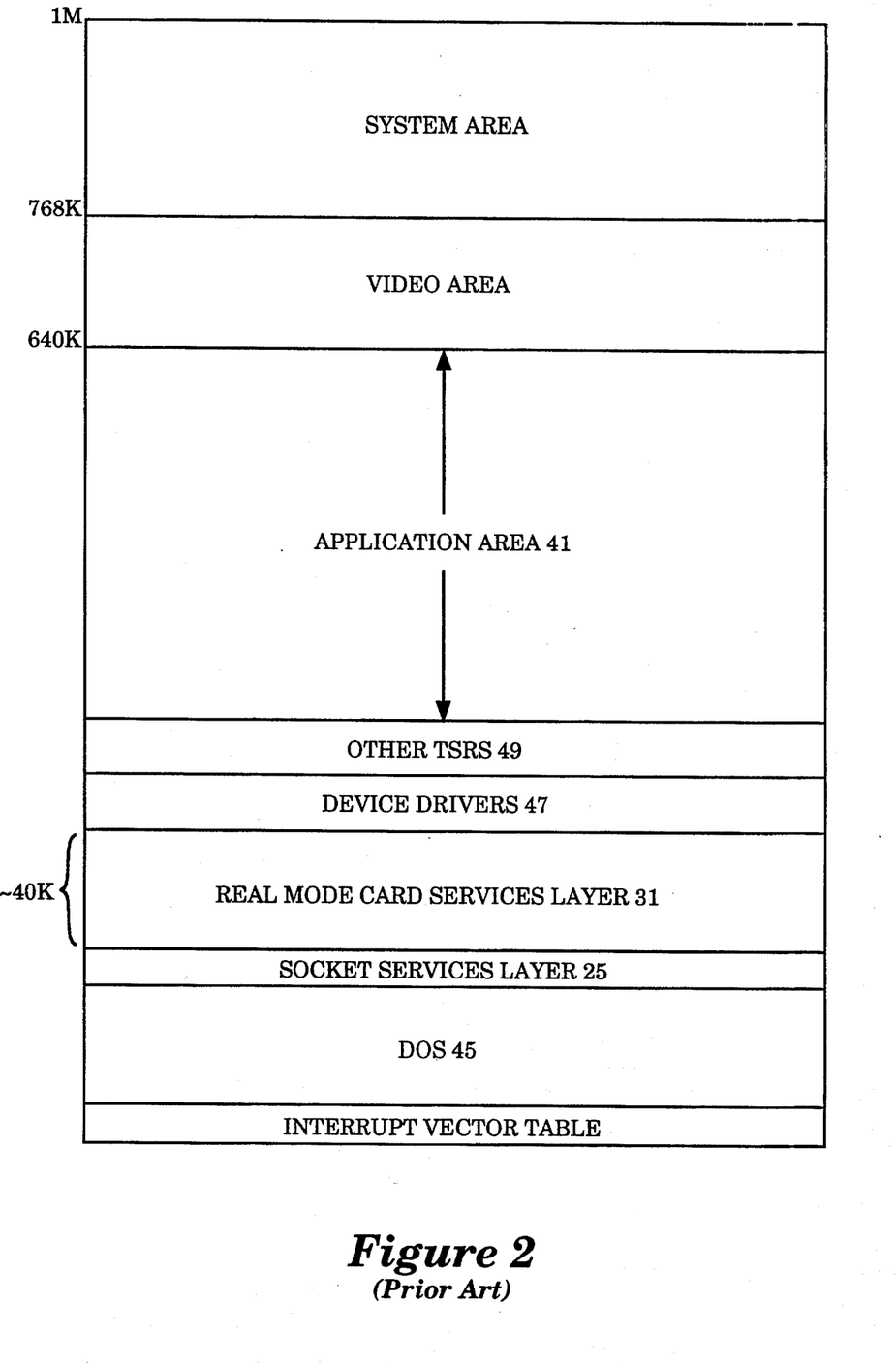
FIG. 2 is a typical memory map of a real mode DOS machine after DOS, a Socket Services device driver, a Card Services device driver, other device drivers, and Terminate and Stay Resident (TSR) programs have been loaded.

FIG. 2 illustrates a typical memory map of a real mode DOS computer system with real-mode Card Services and Socket Services layers loaded. In the DOS computer system illustrated in FIG. 2, the Card Services and Socket Services software layers are implemented as Terminate and Stay Resident (TSR) programs or device drivers. The Socket Services layer 25 and Card Services layer 31 illustrated in FIG. 2 use valuable memory below the 640K barrier. Since the Socket Services layer 25 only uses about 3K of memory, it does not significantly reduce the amount of memory available to DOS applications in the application area 41.

However, the real mode Card Services layer 31 requires approximately 40K of memory such that it significantly decreases the amount of real mode memory available to DOS application programs in the DOS application area 41. It is therefore desirable to implement Card Services in a different manner such that Card Services does not require very much valuable memory below the DOS 640K barrier.

Card Services in Protected Mode

To make IBM®-compatible personal computers easier to use, the IBM®-compatible personal computer market needed an operating system with a graphical user interface (GUI). To fulfill the demand for a graphical user interface for IBM-compatible personal computers, Microsoft® created the Windows™ operating environment. The Microsoft® Windows™ operating environment remains downwardly compatible with the existing Microsoft® DOS operating system used on IBM-compatible personal computers. Microsoft® Windows™, running in enhanced mode, uses the protected mode of Intel 386 or greater microprocessors. By using the protected mode, Microsoft® Windows™ is able to use extended memory.

Protected mode implementations of Card Services that run in the Microsoft® Windows™ operating environment have been proposed. The protected mode implementations of Card Services place the Card Services layer up in the extended regions of memory such that no real mode memory is used. (See "An Architecture for Implementing PCMCIA Card Services Under the Windows Operating System in Enhanced Mode", Ser. No. 08/041,705, filed Apr. 1, 1993.) Thus, the size of the DOS application area for DOS applications is not reduced by the Card Services layer at all.

However, the protected mode implementations of Card Services have a compatibility problem with some programs that operate in real mode. Specifically, since a protected mode implementation of Card Services that runs in the Microsoft® Windows™ operating environment cannot be loaded until the Microsoft® Windows™ operating environment is loaded, any real mode applications, device drivers, or TSRs that require Card Services during the computer system boot process will not operate properly. Such programs expect to find a real mode implementation of Card Services already loaded so that they can register as Card Services clients, and get information about sockets during the computer system boot process.

The Card Services Compatibility Driver

The present invention solves the compatibility problem with real mode programs that require Card Services during the computer system boot by introducing the concept of a Card Services Compatibility Driver. The Card Services Compatibility Driver is a DOS loadable device driver that acts as a temporary Card Services layer until the full protected mode Card Services implementation is loaded.

The Card Services Compatibility Driver simulates an environment in which there are no cards in any of the sockets. The Card Services Compatibility Driver simulates this environment even though cards may be present in the sockets. By acting as if no cards are present, the Card Services Compatibility Driver can return a NO CARD return code for a great majority of the Card Services functions. Thus, the Card Services Compatibility Driver only needs to fully implement the small subset of Card Services functions that are legal when no cards are present in the computer system.

Eventually, the computer loads the full protected mode Card Services implementation. After the computer loads the full protected mode Card Services implementation, the full protected mode Card Services implementation requests the Card Services Compatibility Driver for all the information that the Card Services Compatibility Driver obtained during the computer system boot process. After passing this information, all subsequent requests for Card Services functions are routed to the full protected mode Card Services implementation.

System Description

Figure 3A:
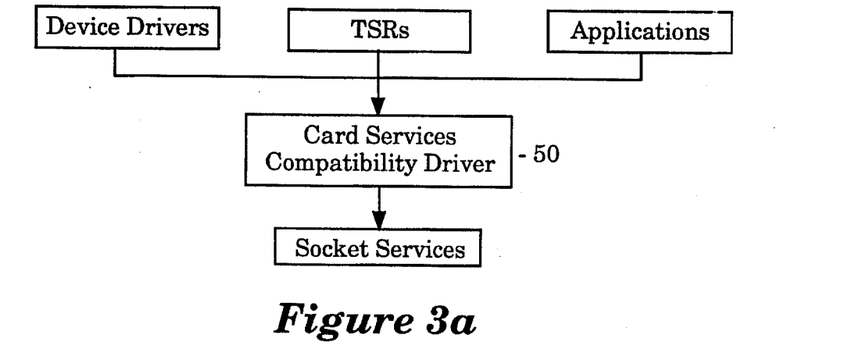
FIG. 3a illustrates a block diagram of the program interactions in a computer system using a Card Services Compatibility Driver during the computer boot stage.

FIG. 3a illustrates how the program entities interact during the computer system boot before the Windows™ operating environment has been loaded. As illustrated in FIG. 3a, all requests for Card Services functions are handled by a Card Services Compatibility Driver 50. The real mode application programs, device drivers, and TSRs can register as Card Services client. The programs can also get status and perform some of the physical to logical mappings. However, the Card Services clients will not receive any card insertion callbacks at this time.

Figure 3B:
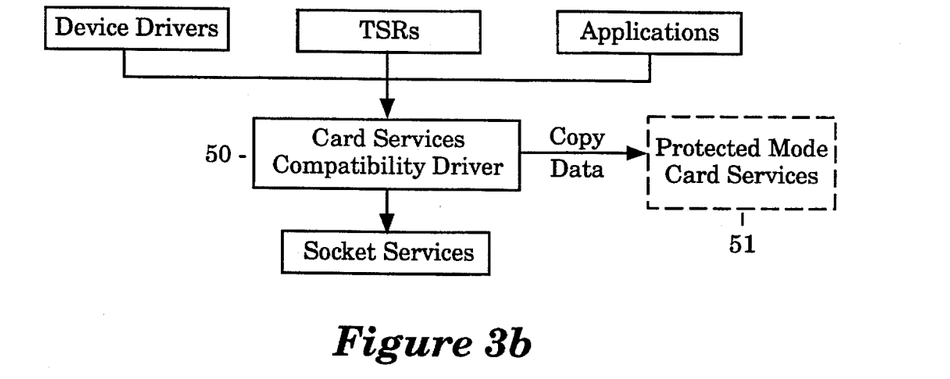
FIG. 3b illustrates a block diagram of the program interactions in the computer system of FIG. 3a when a protected mode Card Services implementation has been loaded and the Card Services Compatibility Driver is transferring its database to the protected mode Card Services implementation.

FIG. 3b illustrates how the program entities interact during the computer system boot after the Windows™ operating environment and the full protected mode Card Services implementation 51 have been loaded. After the computer loads the full protected mode Card Services implementation, the full protected mode Card Services implementation 51 requests the Card Services Compatibility Driver 50 to provide all the information that the Card Services Compatibility Driver 50 collected during the computer system boot. This information includes: the socket services data structure; a list of registered Card Services clients (including handles, callback entry points, client data, global event mask); a list of registered erase queues; a list of registered timers (with amount of time remaining on each timer); and the available resources (if appropriate for the operating environment). Note that the Card Services Compatibility Driver 50 and the full protected mode Card Services implementation 51 must perform physical/logical socket and window mapping in the same manner in order for the transition to be transparent. After obtaining the information, the full protected mode Card Services implementation 51 will take over the INT 1A entry point from the Card Services Compatibility Driver 50 and assume the role of Card Services provider to all Card Services clients. The protected mode Card Services implementation 51 then informs the registered Card Services clients about any cards present in the system by performing card insertion callbacks for all the cards present in the system.

Figure 3C:
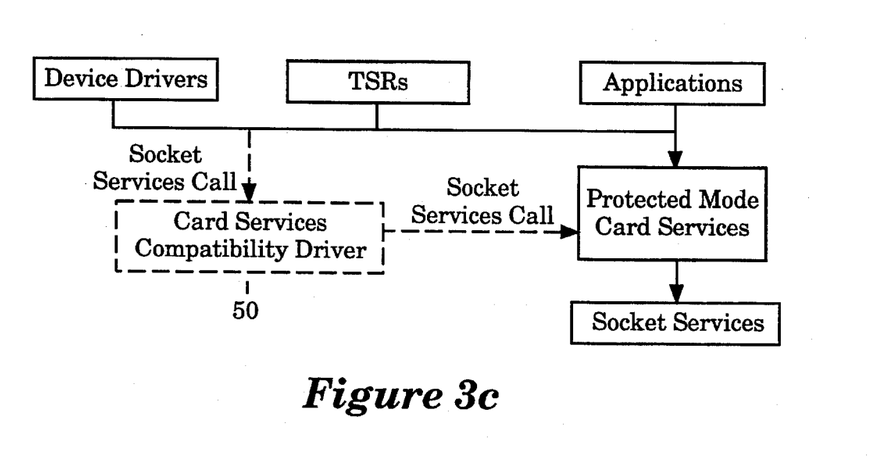
FIG. 3c illustrates a block diagram of the program interactions in the computer system of FIG. 3b when the protected mode Card Services implementation has taken control from the Card Services Compatibility Driver.

Finally, FIG. 3c illustrates how the program entities interact after the computer system boot has completed. The Card Services Compatibility Driver 50 will no longer be used for Card Services calls. However, since a client may have called ReturnSSEntry, the Card Services Compatibility Driver 50 must continue support for the Socket Services entry point provided to the Card Services client. When the Socket Services entry point is called by a Card Services client, control will be passed to the protected mode Card Services 51 Socket Services entry point.

Figure 4:
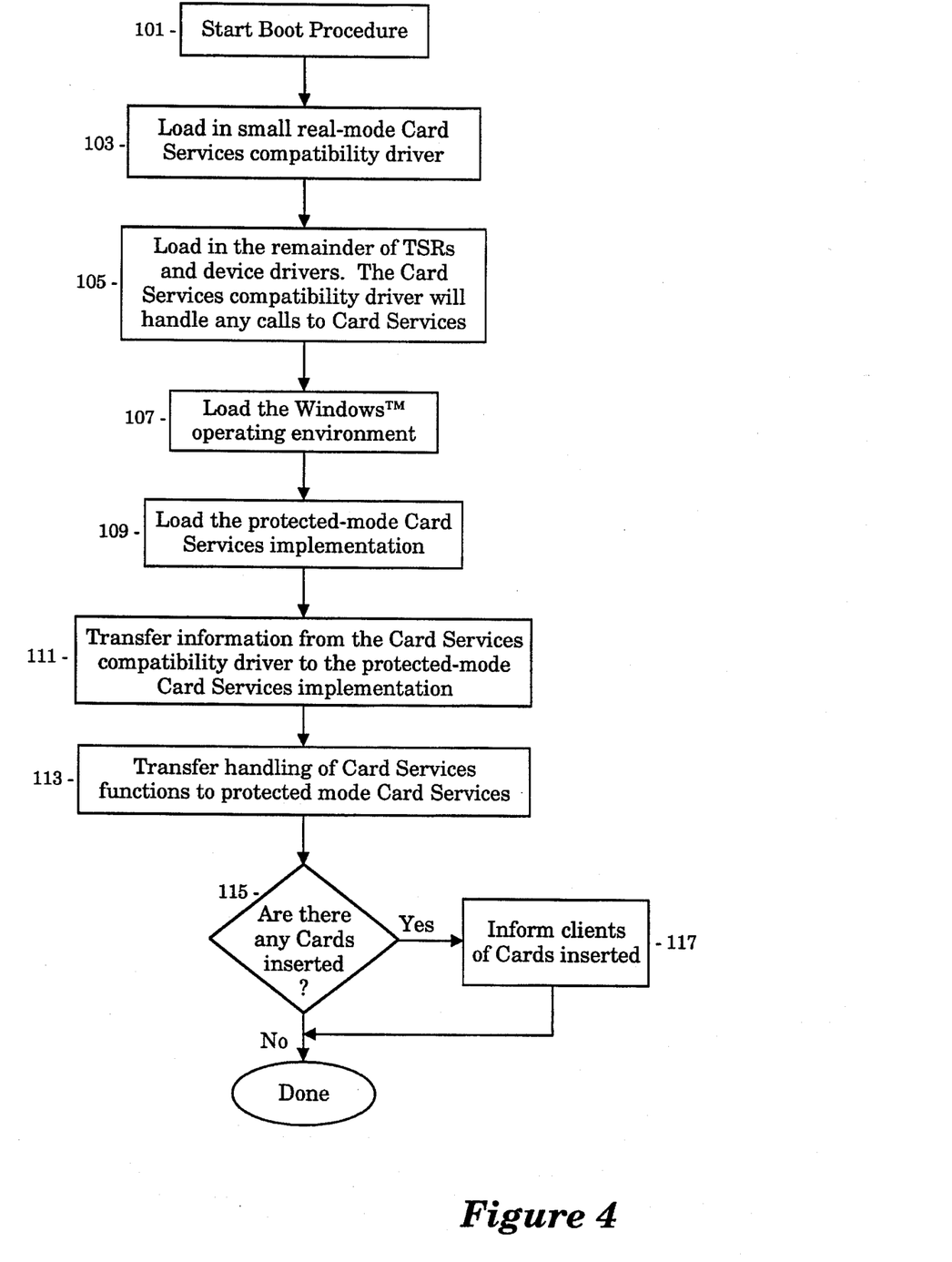
FIG. 4 illustrates a flow diagram of the steps required by present invention.

FIG. 4 illustrates the steps of the present invention. First, at step 101, the computer system boot procedure is initiated. The computer performs the normal boot procedure at dictated by the ROM BIOS present in the computer. During the boot procedure, the computer executes commands out of a CONFIG.SYS file. The CONFIG.SYS file causes the Card Services Compatibility Driver to be loaded into memory as stated in step 103.

The computer proceeds to load in other TSRs and device drivers during the boot process, as stated in step 105. As each new TSR or device driver initializes itself, it may attempt to register with Card Services. The Card Services Compatibility Driver processes the registration requests as a normal Card Services implementation would. The Card Services Compatibility Driver, however, informs each registering Card Services client that no cards are installed in the system even if cards are installed.

At step 107, the computer system loads in the Windows operating environment. In the present embodiment, the computer loads in Microsoft® Windows™ 3.1. However, any current or future protected mode implementation of Windows™ may be loaded. At step 109, the computer loads in a full protected-mode implementation of Card Services. The protected-mode implementation of Card Services is loaded into the extended memory area such that it does not reduce the amount of memory available to real-mode DOS programs.

After the full protected-mode implementation of Card Services has been loaded, the Card Services Compatibility Driver passes all the state information that it has collected to the newly loaded protected-mode implementation of Card Services at step 111. The transferred state information includes:

1) The Socket Services data structure.
2) The list of clients that have registered with Card Services.
3) A list of the registered erase queues.
4) A list of registered timers. (The amount of time remaining on each timer is provided.)
5) Available resources (if appropriate for the operating environment).

At step 113, the system transfers control of the INT 1A software interrupt to the protected-mode implementation of Card Services. By transferring control of the INT 1A software interrupt to the protected-mode implementation of Card Services, all future requests for Card Services functions will be routed to the protected-mode implementation of Card Services. Thus the Card Services Compatibility Driver has been relieved of its duty.

At step 115, the protected-mode implementation of Card Services examines the slots to see if any Cards are present.

If no cards are present, then the Card Services initialization procedure is complete.

However, if one or more cards are present in the system then the protected-mode implementation of Card Services may need to inform some of the registered clients of Card Services. The protected-mode implementation of Card Services first examines the list of registered clients to find the clients that wish to know about card insertions. The protected-mode implementation of Card Services then performs "callbacks" to those clients informing the clients that a card has been inserted, as stated in step 117. After informing all registered clients that wish to know about card insertions about all the cards present in the system, then the Card Services initialization procedure is complete.

Figure 5:
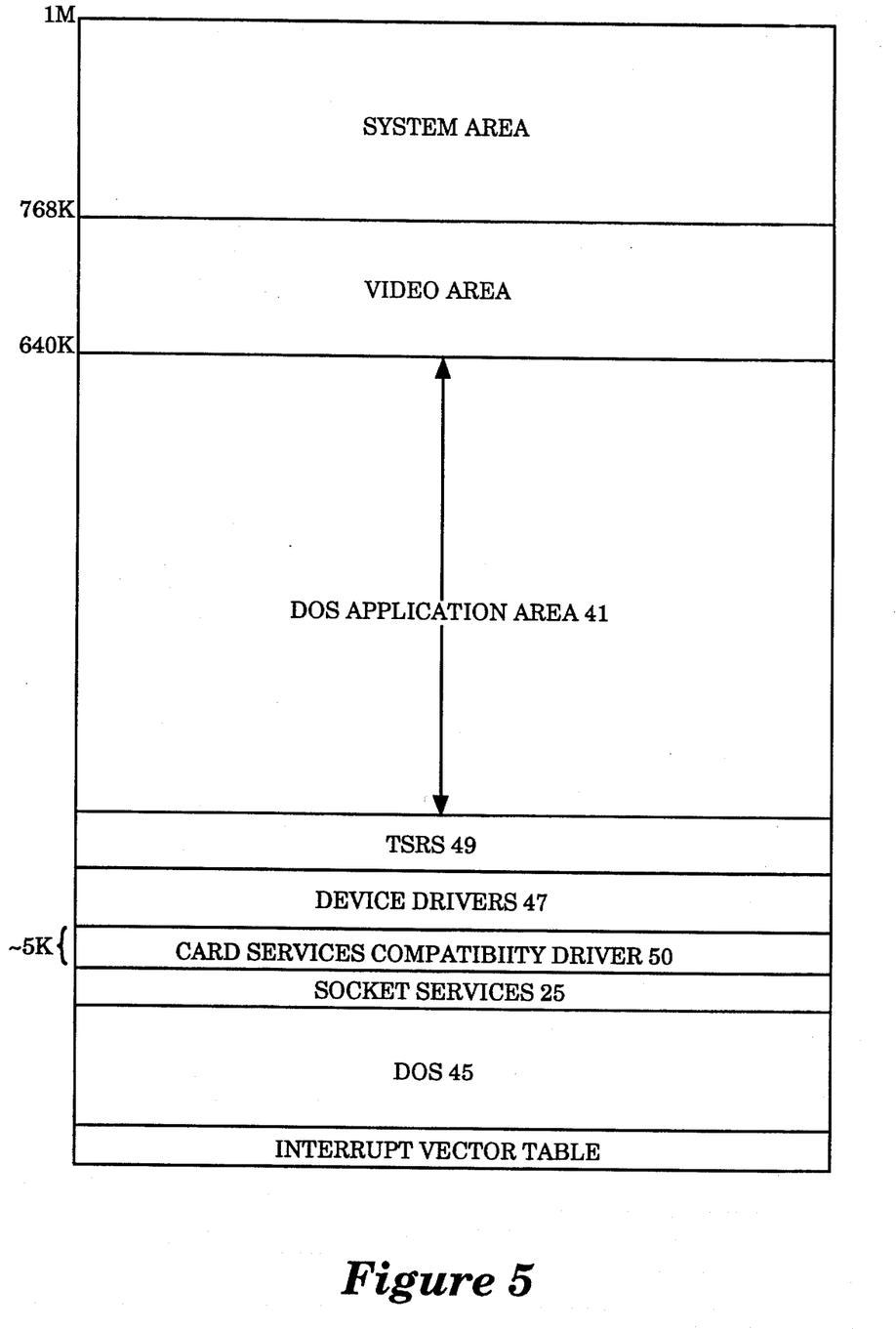
FIG. 5 illustrates a memory map of the real mode memory area after DOS, a Socket Services device driver, the Card Services Compatibility Driver, other device drivers, and Terminate and Stay Resident (TSR) programs have been loaded.

FIG. 5 illustrates how the real mode memory area appears after using the Card Services Compatibility Driver 50 of the present invention. Since the Card Services Compatibility Driver 50 is very small (less than 5K), the Card Services Compatibility Driver 50 does not use very much real mode memory. Thus, the Card Services Compatibility Driver 50 does not significantly decrease the size of the DOS application area 41.

Card Services Compatibility Driver Implementation Details

The Card Services Compatibility Driver will be implemented as a combination DOS loadable device driver or TSR. Although the Card Services Compatibility Driver needs to handle all Card Services requests, the Card Services Compatibility Driver can return either NO CARD or BAD HANDLE for most of the functions. The list below describes what action needs to be taken for each of the Card Services functions.

AddSocketServices—The AddSocketServices function is fully implemented by the Card Services Compatibility Driver. Thus new Socket Services handlers may be added during the boot process.

AdjustResourceInfo—The AdjustResourceInfo function normally makes adjustments to the Card Services internal database of system resources that can be allocated for use by clients. If the operating environment allows the external definition of resource availability, the Card Services Compatibility Driver will retain the information provided by an AdjustResourceInfo function call. The Card Services Compatibility Driver eventually passes this information to the protected mode Card Services implementation for the protected mode Card Services implementation to use. If the operating environment does not allow the external definition of resources, the Card Services Compatibility Driver will return IN USE.

CheckEraseQueue—The CheckEraseQueue function is fully implemented by the Card Services Compatibility Driver. The Card Services Compatibility Driver responds to erase requests by setting queue entries to MEDIA_MISSING.

CloseMemory—The Card Services Compatibility Driver returns BAD HANDLE to any CloseMemory requests since no memory handles exist yet.

CopyMemory—The Card Services Compatibility Driver returns BAD HANDLE to any CopyMemory requests since no memory handles exist yet.

DeregisterClient—The DeregisterClient function is fully implemented by the Card Services Compatibility Driver to allow Card Services clients to deregister.

DeregisterEraseQueue—The Card Services Compatibility Driver fully implements the DeregisterEraseQueue function to allow Card Services clients to deregister an erase queues that it previously registered.

GetCardServicesInfo—The Card Services Compatibility Driver fully implements the GetCardServicesInfo function to return the number of logical sockets installed and information about the Card Services implementation.

GetClientInfo—The Card Services Compatibility Driver fully implements the GetClientInfo function to return information about a registered client.

GetConfigurationInfo—The Card Services Compatibility Driver responds to a GetConfigurationInfo request by returning NO CARD, even though a card may be present in the system.

GetEventMask—The Card Services Compatibility Driver fully implements GetEventMask requests for global masks. However, if a client request information about a particular socket, the Card Services Compatibility Driver responds by returning NO CARD, even though a card may be present in the system.

GetFirstClient—The Card Services Compatibility Driver fully implements GetFirstClient requests for non-socket specific information. However, if a client makes a GetFirstClient request for information about a specific socket, the Card Services Compatibility Driver responds by returning NO CARD, even though a card may be present in the socket.

GetFirstPartition—The Card Services Compatibility Driver responds to GetFirstPartition requests by returning NO CARD, even though a card may be present in the system.

GetFirstRegion—The Card Services Compatibility Driver responds to GetFirstRegion requests by returning NO CARD, even though a card may be present in the system.

GetFirstTuple—The Card Services Compatibility Driver responds to GetFirstTuple requests by returning NO CARD, even though a card may be present in the system.

GetNextClient—The Card Services Compatibility Driver fully implements GetNextClient requests for non-socket specific information. However, if a client makes a GetNextClient request for information about a specific socket, the Card Services Compatibility Driver responds by returning NO CARD, even though a card may be present in the socket.

GetNextPartition—The Card Services Compatibility Driver responds to GetNextPartition requests by returning NO CARD, even though a card may be present in the socket.

GetNextRegion—The Card Services Compatibility Driver responds to GetNextRegion requests by returning NO CARD, even though a card may be present in the socket.

GetNextTuple—The Card Services Compatibility Driver responds to GetNextTuple requests by returning NO CARD, even though a card may be present in the socket.

GetStatus—The Card Services Compatibility Driver responds to GetNextTuple requests by providing the actual socket status, except that it will say there is no card present even if a card is present.

GetTupleData—The Card Services Compatibility Driver responds to GetTupleData requests by returning NO CARD, even though a card may be present in the socket.

MapLogSocket—The Card Services Compatibility Driver fully implements the MapLogSocket function.

MapLogWindow—The Card Services Compatibility Driver fully implements the MapLogWindow function.

MapMemPage—The Card Services Compatibility Driver responds to MapMemPage requests by returning NO CARD, even though a card may be present in the socket.

MapPhySocket—The Card Services Compatibility Driver fully implements the MapPhySocket function.

MapPhyWindow—The Card Services Compatibility Driver fully implements the MapPhyWindow function.

ModifyConfiguration—The Card Services Compatibility Driver responds to ModifyConfiguration requests by returning NO CARD, even though a card may be present in the socket.

ModifyWindow—The Card Services Compatibility Driver responds to ModifyWindow requests by returning NO CARD, even though a card may be present in the socket.

OpenMemory—The Card Services Compatibility Driver responds to OpenMemory requests by returning NO CARD, even though a card may be present in the socket.

ReadMemory—The Card Services Compatibility Driver responds to ReadMemory requests by returning NO CARD, even though a card may be present in the socket.

RegisterClient—The Card Services Compatibility Driver fully implements the RegisterClient function such that device drivers, TSRs, and application programs may register with Card Services.

RegisterEraseQueue—The Card Services Compatibility Driver fully implements the RegisterEraseQueue function such that Card Services clients may register erase queues with Card Services.

RegisterMTD—The Card Services Compatibility Driver responds to RegisterMTD requests by returning NO CARD, even though a card may be present in the socket.

RegisterTimer—The Card Services Compatibility Driver fully implements the RegisterTimer function such that Card Services clients may register timers within Card Services to have Card Services callback the client.

ReleaseConfiguration—The Card Services Compatibility Driver implements the ReleaseConfiguration function by returning BAD HANDLE since no card could have been configured. No card could have been configured since the RequestConfiguration function is not implemented by the Card Services Compatibility Driver.

ReleaseExclusive—The Card Services Compatibility Driver implements the ReleaseExclusive function by returning BAD HANDLE since no exclusive access to a card could have been granted. No exclusive access to a card could have been granted since the RequestExclusive function is not implemented by the Card Services Compatibility Driver.

ReleaseIO—The Card Services Compatibility Driver implements the ReleaseIO function by returning BAD HANDLE since no preceding RequestIO could have been performed.

ReleaseIRQ—The Card Services Compatibility Driver implements the ReleaseIRQ function by returning BAD HANDLE since no preceding RequestIRQ could have been performed.

ReleaseSocketMask—The Card Services Compatibility Driver implements the ReleaseSocketMask function by returning BAD HANDLE since no preceding RequestSocketMask could have been performed.

ReleaseWindow—The Card Services Compatibility Driver implements the ReleaseWindow function by returning BAD HANDLE since no preceding RequestWindow could have been performed.

ReplaceSocketServices—The Card Services Compatibility Driver fully implements the ReplaceSocketServices function such that newer Socket Services implementation may an older Socket Services implementation.

RequestConfiguration—The Card Services Compatibility Driver responds to RequestConfiguration requests by returning NO CARD, even though a card may be present in the socket.

RequestExclusive—The Card Services Compatibility Driver responds to RequestExclusive requests by returning NO CARD, even though a card may be present in the socket.

RequestIO—The Card Services Compatibility Driver responds to RequestIO requests by returning NO CARD, even though a card may be present in the socket.

RequestIRQ—The Card Services Compatibility Driver responds to RequestIRQ requests by returning NO CARD, even though a card may be present in the socket.

RequestSocketMask—The Card Services Compatibility Driver responds to RequestSocketMask requests by returning NO CARD, even though a card may be present in the socket.

RequestWindow—The Card Services Compatibility Driver responds to RequestWindow requests by returning NO CARD, even though a card may be present in the socket.

ResetCard—The Card Services Compatibility Driver responds to ResetCard requests by returning NO CARD, even though a card may be present in the socket.

ReturnSSEntry—The Card Services Compatibility Driver fully implements the ReturnSSEntry function such that an entry point into Socket Services is returned. The Socket Services entry point return to the Card Services client must continue to be supported even after the Card Services Compatibility Driver has given over Card Services responsibility to the full protected mode Card Services implementation.

SetEventMask—The Card Services Compatibility Driver implements the SetEventMask function to allow Card Services clients set global masks. However, if a Card Services client attempts to set an Event Mask for a specific socket the SetEventMask function responds with NO CARD.

SetRegion—The Card Services Compatibility Driver responds to SetRegion requests by returning NO CARD, even though a card may be present in the socket.

ValidateCIS—The Card Services Compatibility Driver responds to ValidateCIS requests by returning NO CARD, even though a card may be present in the socket.

VendorSpecific—The Card Services Compatibility Driver responds to VendorSpecific requests by returning BAD FUNCTION.

WriteMemory—The Card Services Compatibility Driver responds to WriteMemory requests by returning NO CARD, even though a card may be present in the socket.

What is claimed is:

1. In a computer system, operable in a real mode and in a protected mode, and comprising a PCMCIA adapter, a method of providing Card Services functions to at least one Card Service client, said method comprising the steps of:

placing said computer system in said real mode;

loading a Card Services compatibility driver into said computer system; simulating a real mode Card Services environment, using said Card Services compatibility driver, wherein no PCMCIA cards are installed in said PCMCIA adapter by supporting only the Card Services functions that are legal when no PCMCIA cards are installed in said PCMCIA adapter, said Card Services compatibility driver collecting state information;

placing said computer system in said protected mode;

loading a protected mode Card Services implementation into said computer system;

transferring said state information from said Card Services compatibility driver to said protected mode Card Services implementation; and transferring control of Card Services function requests to said protected mode Card Services implementation such that said protected mode Card Services implementation services Card Services function requests.

2. The method of providing Card Services functions as claimed in claim 1 further comprising the step of informing said Card Services client of any PCMCIA cards installed in said computer system.

3. The method of providing Card Services functions as claimed in claim 2 wherein said step of informing said Card Services client of any PCMCIA cards installed in said computer system comprises calling a card insertion callback routine in said Card Services client informing said Card Services client about a PCMCIA card insertion.

4. The method of providing Card Services functions as claimed in claim 1 wherein said protected mode Card Services implementation operates in a Windows operating environment.

5. The method of providing Card Services functions as claimed in claim 4 wherein said protected mode Card Services implementation comprises a Windows Virtual Device Driver.

6. The method of providing Card Services functions as claimed in claim 1 wherein said step of simulating a real mode Card Services environment comprises registering one or more Card Services clients.

7. The method of providing Card Services functions as claimed in claim 6 wherein said state information comprises a list of said Card Services clients.

8. The method of providing Card Services functions as claimed in claim 7 wherein said state information further comprises a Socket Services data structure.

9. The method of providing Card Services functions as claimed in claim 8 wherein said state information further comprises a list of registered erase queues.

10. The method of providing Card Services functions as claimed in claim 9 wherein said state information further comprises a list of registered timers and an amount of time remaining on each of said registered timers.

11. A computer system operable in a real mode and in a protected mode, said computer system comprising the elements of:

a PCMCIA adapter;

a Card Services compatibility driver, said Card Services compatibility driver loaded into said computer system during a real mode boot stage, said Card Services compatibility driver simulating a real mode Card Services environment wherein no PCMCIA cards are installed in said PCMCIA adapter by supporting only Card Services functions that are legal when no PCMCIA cards are installed in said PCMCIA adapter, said Card Services compatibility driver collecting state information; and a protected mode Card Services implementation, said protected mode Card Services implementation loaded into said computer system when said computer system is placed in said protected mode and after said Card Services compatibility driver is loaded, said Card Services compatibility driver transferring said state information to said protected mode Card Services implementation, said protected mode Card Services implementation servicing Card Services function requests after said state information is transferred.

12. The computer system as claimed in claim 11 wherein said Card Services compatibility driver registers a Card Services client.

13. The computer system as claimed in claim 12 wherein said protected mode Card Services implementation informs said Card Services client of any PCMCIA cards installed in said PCMCIA adapter by calling a card insertion callback routine in said Card Services client.

14. The computer system as claimed in claim 12 wherein said protected mode Card Services implementation operates in a Windows operating environment.

15. The computer system as claimed in claim 14 wherein said protected mode Card Services implementation comprises a Windows Virtual Device Driver.

16. The computer system as claimed in claim 12 wherein said state information comprises a list of Card Services clients.

17. The computer system as claimed in claim 16 wherein said state information further comprises a Socket Services data structure.

18. The computer system as claimed in claim 17 wherein said state information further comprises a list of registered erase queues.

19. The computer system as claimed in claim 18 wherein said state information further comprises a list of registered timers and an amount of time remaining on each of said registered timers.

\* \* \* \* \*